US012573048B2

(12) United States Patent
Li et al.

(10) Patent No.: US 12,573,048 B2
(45) Date of Patent: Mar. 10, 2026

(54) DISARRANGED-IMAGE PROCESSING METHOD, DEVICE AND STORAGE MEDIUM

(71) Applicant: Beijing Bytedance Network Technology Co., Ltd., Beijing (CN)

(72) Inventors: Siqi Li, Beijing (CN); Yanshan Zhou, Beijing (CN); Xueke Tang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 468 days.

(21) Appl. No.: 18/022,442

(22) PCT Filed: Aug. 13, 2021

(86) PCT No.: PCT/CN2021/112438
§ 371 (c)(1),
(2) Date: Feb. 21, 2023

(87) PCT Pub. No.: WO2022/037484
PCT Pub. Date: Feb. 24, 2022

(65) Prior Publication Data
US 2023/0316529 A1 Oct. 5, 2023

(30) Foreign Application Priority Data
Aug. 21, 2020 (CN) .......................... 202010852486.7

(51) Int. Cl.
*G06T 7/00* (2017.01)
*G06T 7/11* (2017.01)
*G06V 10/56* (2022.01)

(52) U.S. Cl.
CPC ................ *G06T 7/11* (2017.01); *G06V 10/56* (2022.01); *G06T 2207/10024* (2013.01)

(58) Field of Classification Search
CPC .......... A63F 13/52; A63F 9/0612; A63F 9/10; G06T 7/11; G06T 2207/10024; G06V 10/267; G06V 10/56
See application file for complete search history.

(56) References Cited

U.S. PATENT DOCUMENTS

| | | | | |
|---|---|---|---|---|
| 2007/0243919 A1* | 10/2007 | Thelen | ..................... | A63F 13/10 463/9 |
| 2011/0169748 A1* | 7/2011 | Tse | ......................... | G06F 3/0425 345/173 |

(Continued)

FOREIGN PATENT DOCUMENTS

| | | |
|---|---|---|
| CN | 201690498 U | 12/2010 |
| CN | 102158638 A | 8/2011 |

(Continued)

OTHER PUBLICATIONS

Extended European Search Report in EP21857579.3, mailed Jul. 18, 2023, 7 pages.

(Continued)

*Primary Examiner* — Li Liu
(74) *Attorney, Agent, or Firm* — Astute IP Law Group

(57) ABSTRACT

An image processing method and apparatus, a device and a storage medium. The method comprises: acquiring a trigger instruction of a user and a first image, wherein the first image comprises two or more sub-images, and the positions of the two or more sub-images on the first image are disarranged; according to the trigger instruction, randomly exchanging the positions of the sub-images on the first image, displaying a process of randomly exchanging the sub-images until all the sub-images on the first image are restored to the position before the disarrangement, and obtaining a second image; and displaying the second image obtained by restoration.

17 Claims, 7 Drawing Sheets

Acquire a trigger instruction of a user and a first image — 101

Randomly exchange positions of the sub-images on the first image in response to the trigger instruction, and display a process of the random exchange of sub-images, until all the sub-images on the first image are restored to positions before being disarranged, to acquire a second image — 102

Display the acquired second image — 103

(56)        References Cited

U.S. PATENT DOCUMENTS

| | | | |
|---|---|---|---|
| 2011/0300931 A1* | 12/2011 | Kitahara | ............... A63F 13/213 |
| | | | 463/43 |
| 2015/0352435 A1 | 12/2015 | Imai et al. | |
| 2017/0065895 A1 | 3/2017 | Felix et al. | |
| 2017/0120141 A1* | 5/2017 | Baddoo | ................ A63F 13/352 |
| 2017/0337373 A1 | 11/2017 | Conti et al. | |

FOREIGN PATENT DOCUMENTS

| | | | |
|---|---|---|---|
| CN | 103324817 A | | 9/2013 |
| CN | 105511759 A | | 4/2016 |
| CN | 106023284 A | * | 10/2016 |
| CN | 110152285 A | * | 8/2019 |
| CN | 110170164 A | * | 8/2019 |
| CN | 111145083 A | | 5/2020 |
| CN | 112163993 A | | 1/2021 |
| WO | 2016127717 A1 | | 8/2016 |

OTHER PUBLICATIONS

International Search Report, mailed on Oct. 26, 2021, International Patent Application No. PCT/CN2021/112438, International Filing Date Aug. 13, 2021.

Imsz5460, "Let your puzzle smart-Automatically restoring the puzzle", Blog Garden, Jan. 18, 2018. 4 pages.

* cited by examiner

| | |
|---|---|
| Acquire a trigger instruction of a user and a first image | ⌐ 101 |

↓

| | |
|---|---|
| Randomly exchange positions of the sub-images on the first image in response to the trigger instruction, and display a process of the random exchange of sub-images, until all the sub-images on the first image are restored to positions before being disarranged, to acquire a second image | ⌐ 102 |

↓

| | |
|---|---|
| Display the acquired second image | ⌐ 103 |

Figure 1

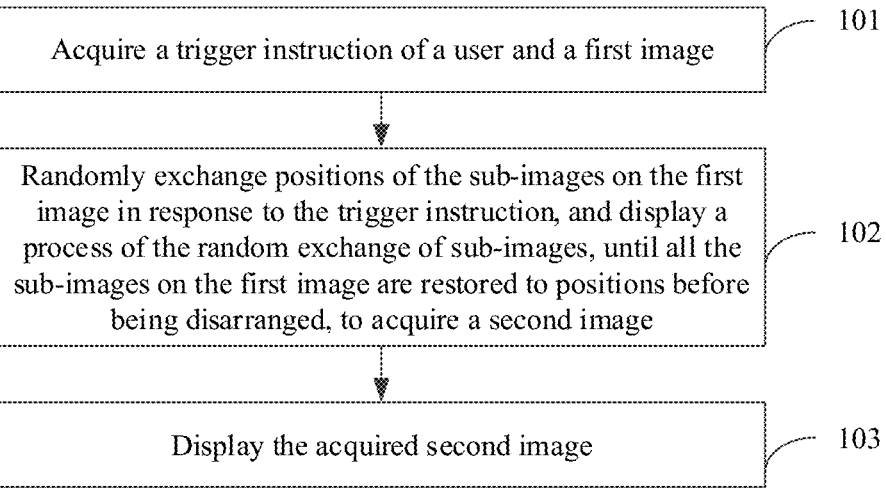
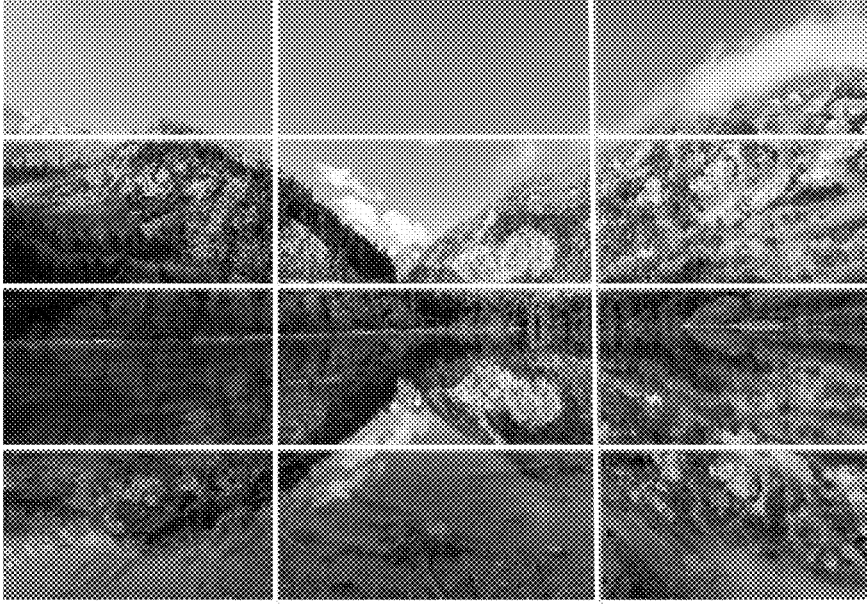

Figure 2A

Position exchange

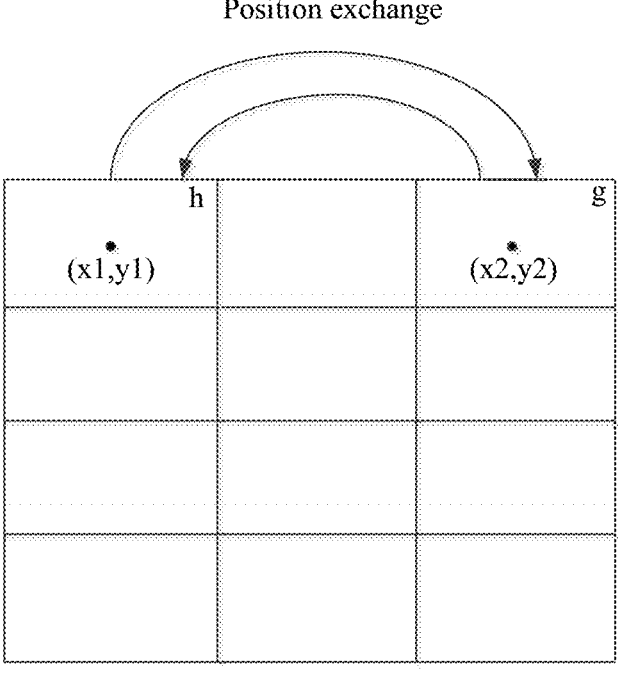

Figure 6B

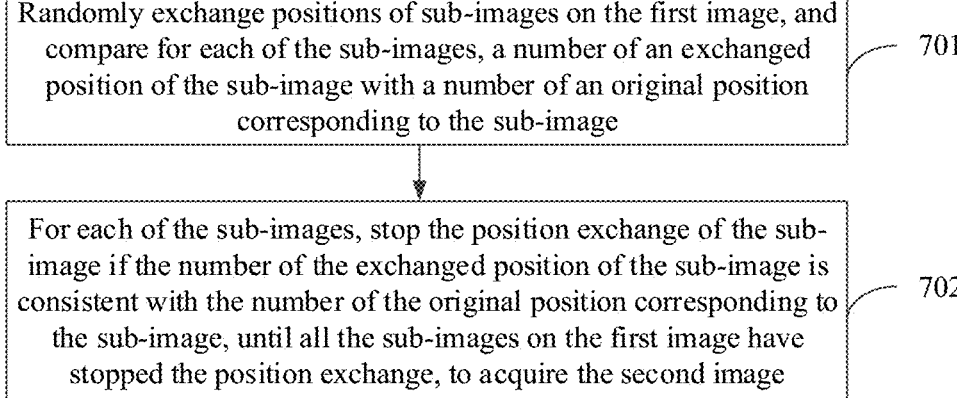

701 — Randomly exchange positions of sub-images on the first image, and compare for each of the sub-images, a number of an exchanged position of the sub-image with a number of an original position corresponding to the sub-image 702 — For each of the sub-images, stop the position exchange of the sub-image if the number of the exchanged position of the sub-image is consistent with the number of the original position corresponding to the sub-image, until all the sub-images on the first image have stopped the position exchange, to acquire the second image

Figure 7

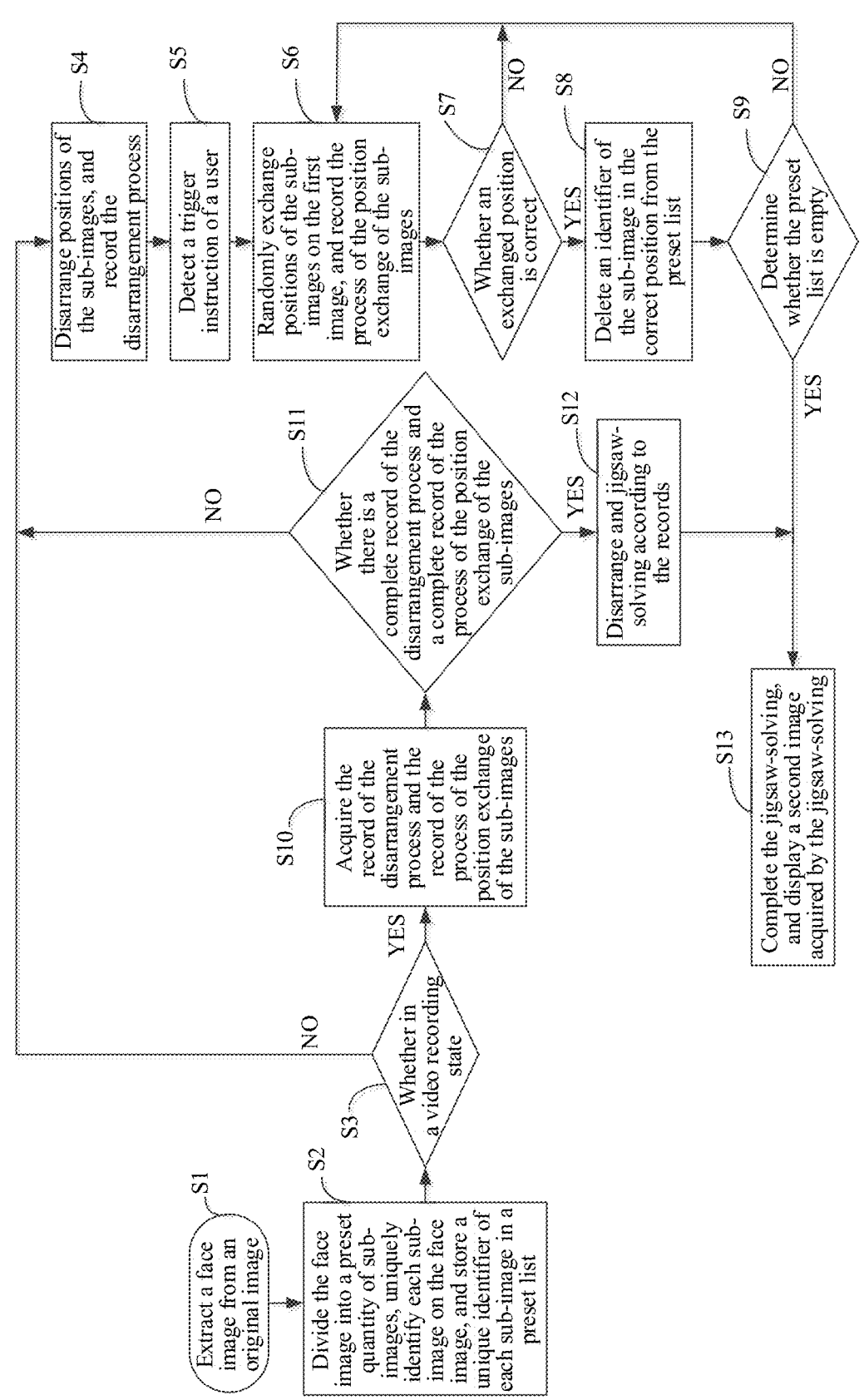

Figure 8

S1 Extract a face image from an original image

S2 Divide the face image into a preset quantity of sub-images, uniquely identify each sub-image on the face image, and store a unique identifier of each sub-image in a preset list S3 Whether in a video recording state

NO

YES

S4 Disarrange positions of the sub-images, and record the disarrangement process S5 Detect a trigger instruction of a user S6 Randomly exchange positions of the sub-images on the first image, and record the process of the position exchange of the sub-images S7 Whether an exchanged position is correct

NO

YES

S8 Delete an identifier of the sub-image in the correct position from the preset list S9 Determine whether the preset list is empty

NO

YES

S10 Acquire the record of the disarrangement process and the record of the process of the position exchange of the sub-images S11 Whether there is a complete record of the disarrangement process and a complete record of the process of the position exchange of the sub-images

NO

YES

S12 Disarrange and jigsaw-solving according to the records

S13 Complete the jigsaw-solving, and display a second image acquired by the jigsaw-solving

1000

DISARRANGED-IMAGE PROCESSING METHOD, DEVICE AND STORAGE MEDIUM

This application is the national phase of International Patent Application No. PCT/CN2021/112438, titled "IMAGE PROCESSING METHOD AND APPARATUS, DEVICE AND STORAGE MEDIUM", filed on Aug. 13, 2021, which claims priority to Chinese Patent Application No. 202010852486.7, titled "IMAGE PROCESSING METHOD AND APPARATUS, DEVICE AND STORAGE MEDIUM", filed on Aug. 21, 2020 with the China National Intellectual Property Administration (CNIPA), both of which are incorporated herein by reference in their entireties.

FIELD

The present disclosure relates to the technical field of image processing, and in particular, to an image processing method, apparatus, device, and storage medium.

BACKGROUND

Video applications provided by related technologies can provide users with the function of shooting or watching videos. As more and more users shoot or watch videos through video applications, there is a great need to provide users with more display effects and improved user experience when the users shoot or watch the videos.

SUMMARY

In order to solve the above technical problem or at least partially solve the above technical problem, an image processing method, apparatus, device and storage medium are provided in the present disclosure.

In a first aspect, an image processing method is provided in an embodiment of the present disclosure. The method includes: acquiring a trigger instruction of a user and a first image. The first image includes two or more sub-images. Positions of the two or more sub-images on the first image are disarranged. The method further includes: randomly exchanging positions of the sub-images on the first image in response to the trigger instruction, and displaying a process of the random exchange of the sub-images, until all the sub-images on the first image are restored to positions before being disarranged, to acquire a second image; and displaying the acquired second image.

In a second aspect, an image processing apparatus is provided in an embodiment of the present disclosure. The image processing apparatus includes:

a first acquisition module, configured to acquiring a trigger instruction of a user and a first image, the first image including two or more sub-images, and positions of the two or more sub-images on the first image being disarranged;

an image position exchange module, configured to randomly exchange positions of the sub-images on the first image in response to the trigger instruction, until all the sub-images on the first image restore to positions before being disarranged, to acquire a second image; and a display module, configured to display a process of the random exchange of sub-images, and display the acquired second image.

In a third aspect, a terminal device is provided in an embodiment of the present disclosure. The terminal device includes a processor and a memory. The memory stores a computer program which, when being executed the processor, causes the method according to the above first aspect to be implemented.

In a fourth aspect, a computer-readable storage medium is provided in an embodiment of the present disclosure. The computer-readable storage medium stores a computer program which, when being executed a processor, causes the method according to the above first aspect to be implemented.

Compared with the conventional technology, the technical solutions provided by the embodiments of the present disclosure have the following advantages.

In an embodiment of the present disclosure, a trigger instruction of a user and a first image are acquired, and then a jigsaw-solving operation is performed on the first image in response to the acquired trigger instructions. During the jigsaw-solving operation, positions of sub-images on the first image are randomly exchanged, so that all the sub-images on the first image are restored to positions before the disarrangement, to acquire a second image after the jigsaw-solving operation. The process of random exchange of sub-images and the second image after the jigsaw-solving operation are displayed, so that the entire process of the jigsaw-solving operation is visible to users. In the embodiment of the present disclosure, the jigsaw-solving operation is performed by randomly exchanging positions of sub-images, the jigsaw-solving process is random and a flashing effect may be shown, thereby providing richer display effects and more interests, and improving the user experience.

BRIEF DESCRIPTION OF THE DRAWINGS

The accompanying drawings herein, which are incorporated in and constitute a part of this specification, illustrate embodiments consistent with the present disclosure and together with the description serve to explain the principles of the present disclosure.

In order to more clearly illustrate technical solutions in embodiments of the present disclosure or in the conventional technology, the accompanying drawings to be used in the description of the embodiments or the conventional technology will be briefly introduced below. Obviously, other drawings may be obtained by the skilled in the art from these drawings without any creative effort.

FIG. 1 is a flowchart of an image processing method according to an embodiment of the present disclosure;

FIG. 2A is a schematic diagram of an example of dividing an image into 12 sub-images;

FIG. 6B is a schematic diagram showing that the sub-images in FIG. 6A are disarranged;

FIG. 7 is a flowchart of a method of randomly exchanging positions of sub-images according to another embodiment of the present disclosure;

FIG. 8 is a flowchart of an image processing method according to another embodiment of the present disclosure;

DETAILED DESCRIPTION OF EMBODIMENTS

In order to more clearly understand the above objects, features and advantages of the present disclosure, the solutions of the present disclosure will be further described below. It should be noted that the embodiments of the present disclosure and features in the embodiments may be combined with each other if there is no conflict.

Many specific details are set forth in the following description to facilitate a full understanding of the present disclosure, but there are other ways different from those described herein to implement the present disclosure. Obviously, the embodiments in the specification are only a part rather than all of embodiments of the present disclosure.

FIG. 1 is a flowchart of an image processing method according to an embodiment of the present disclosure. The method may be performed by a terminal device. The terminal device may be understood as equipment with image processing capability, such as mobile phones, tablets, laptops, desktops, and smart TVs. In some embodiments, the terminal device referred to may be equipped with a camera and other shooting equipment. The terminal device can take photos or videos by the shooting equipment, and can perform the method according to the embodiment on the image taken by the shooting equipment. In other embodiments, the terminal device referred to may further have gallery or album function, and the terminal device can perform the method according to the embodiment on an image or video images in the gallery or album. As shown in FIG. 1, the method according to the embodiment includes the following steps S101 to S103.

In Step 101, a trigger instruction of a user and a first image are acquired. The first image includes two or more sub-images. Positions of the two or more sub-images on the first image are disarranged.

Figure 2B:
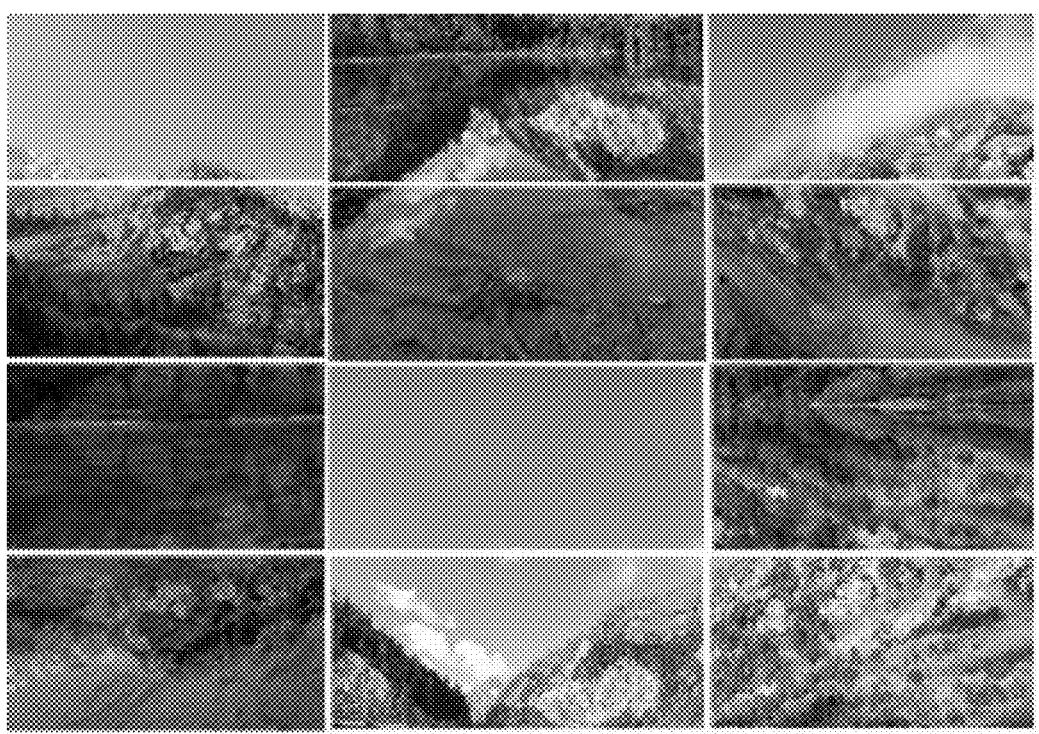
FIG. 2B is a schematic diagram showing that the sub-images in FIG. 2A are disarranged.

The first image referred to in this embodiment is acquired by dividing an image into a preset quantity (greater than or equal to 2) of sub-images and then disarranging positions of the sub-images. The size and shape of each sub-image may be the same or different. For example, FIG. 2A is a schematic diagram of an example of dividing an image into 12 sub-images, and FIG. 2B is a schematic diagram showing that the sub-images in FIG. 2A are disarranged. As shown in FIG. 2A and FIG. 2B, after acquiring the image shown in FIG. 2A, sub-images in FIG. 2A may be disarranged in a random disarrangement manner or in a preset disarrangement order, to acquire an image shown in FIG. 2B. The image shown in FIG. 2B may be understood as the first image referred to in this embodiment.

The trigger instruction referred to in this embodiment may be triggered by a preset user behavior. The user behavior for example, may be one of blinking, nodding, clicking a preset button, smile trigger, voice trigger, and the like. However, in other embodiments, user behavior may not be limited to these user behaviors, but may be set according to actual needs.

Figure 3:
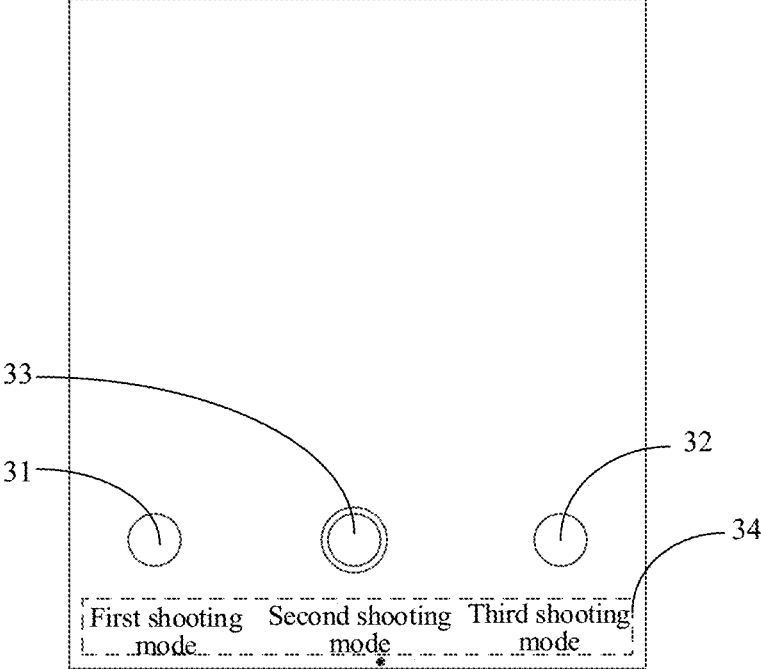
FIG. 3 is a schematic diagram of an operation interface according to an embodiment of the present disclosure.

The first image and the trigger instruction referred to in this embodiment may be acquired after receiving a preset image processing instruction. The image processing instruction referred to in this embodiment may be understood as an instruction triggered by the user performing a specified operation on an operation interface, or may be understood as a specified voice instruction, or may be understood as an instruction triggered by a specified expression or action of the user. Apparently, the above are examples rather than limitations of the image processing instruction. For example, FIG. 3 is a schematic diagram of an operation interface according to an embodiment of the present disclosure. The interface exemplarily includes a first touch area 31, a second touch area 32, a shooting-trigger button 33 between the first touch area 31 and the second touch area 32, and a third touch area 34. The third touch area 34 includes multiple shooting modes, such as camera mode, N-second shooting, M-second shooting and a live mode, but is not limited to these modes. The shooting modes in the third touch area 34 may be selected. The user may select a corresponding shooting mode by a sliding or clicking operation. The black dot in FIG. 3 represents the focus. The shooting mode selected by the user effects at the position of the black dot. The first touch area 31 is used to provide a list of application plug-ins. The application plug-ins in the list may act on a display interface of the terminal device to form specific display effects. The second touch area 32 is used to provide an interface to access a gallery. The user may browse the gallery through the second touch area 32 and select an image or a video from the gallery. The image or video images selected by the user may be displayed on the interface in FIG. 3. As shown in FIG. 3, an image initially displayed in the interface of FIG. 3 may be exemplarily set to an image captured by the camera (front camera or rear camera) on the terminal device in real time. When the user clicks the first touch area 31 and selects an application plug-in corresponding to the embodiment of the present disclosure from the list, a preset dividing processing is performed on the image displayed on the current interface, positions of sub-images acquired through the dividing processing are disarranged, and the image (i.e., the first image) acquired after the disarrangement is displayed on the interface shown in FIG. 3. Alternatively, users may open the gallery by clicking the second touch area 32 on the interface, and select an image or a video from the gallery. The image or video selected by the user will be displayed on the display interface in FIG. 3. At this time, if the user clicks the first touch area 31 to open the list and selects the application plug-in corresponding to the embodiment of the present disclosure from the list, then a preset dividing processing and a disarrangement of positions of sub-images are performed on the image or video images selected from the gallery by the user. The image after the disarrangement is displayed on the display interface in FIG. 3. Further, the trigger instruction may be triggered by the preset user behavior (such as blink or nodding) after acquiring the first image or the user selecting the application plug-in.

The trigger on the operation interface in the above embodiment is only exemplary. The application plug-in corresponding to the embodiment of the present disclosure may be triggered by other preset triggers. For example, in an embodiment, the user may trigger the application plug-in corresponding to the embodiment of the present disclosure with voice. Apparently, the voice trigger is also an example rather than limitation. In fact, the triggering of the application plug-in corresponding to the embodiment may be set as needed.

As an example, in an embodiment, the image displayed on the display interface at the beginning of the dividing processing is referred to as the original image. There may have the following ways to divide the original image.

In a first way, the original image may be directly divided into a preset quantity of sub-images.

In a second way, a target object may be first identified from the original image based on a preset model or algorithm. Then, an image of the target object is extracted from the original image. The image of the target object is divided into a preset quantity of sub-images. The target object may be an object located at a preset position in the image, or may be an object selected by the user on the interface, or may be a preset specific object. Taking a face as an example, in the operation of acquiring the first image based on the original image, a position of a bounding box surrounding the face may be first identified from the original image based on a preset face recognition model, and then a face image is extracted from the original image along the boundary of the bounding box. Or, the face image is extracted from the position of the bounding box in square by taking a longest edge of the bounding box as an edge of the square. Or, the bounding box is extended to the operating interface to acquire an extended edge which is taken as an edge of a square, and the dividing starts from the position of the bounding box based on the square. The size of the specific divided area is not limited in the present disclosure. Then, the acquired face image is divided into a reset quantity of sub-images. Position of these sub-images is disarranged, to acquire the first image.

Apparently, the above two dividing ways are only two exemplary methods provided by the embodiment, not all methods. In fact, the method of dividing the image may be set according to needs, and is not limited to a specific method.

In Step 102, positions of the sub-images on the first image are randomly exchanged in response to the trigger instruction, and a process of the random exchange of sub-images is displayed, until all the sub-images on the first image are restored to positions before being disarranged, to acquire a second image.

Figure 4A:
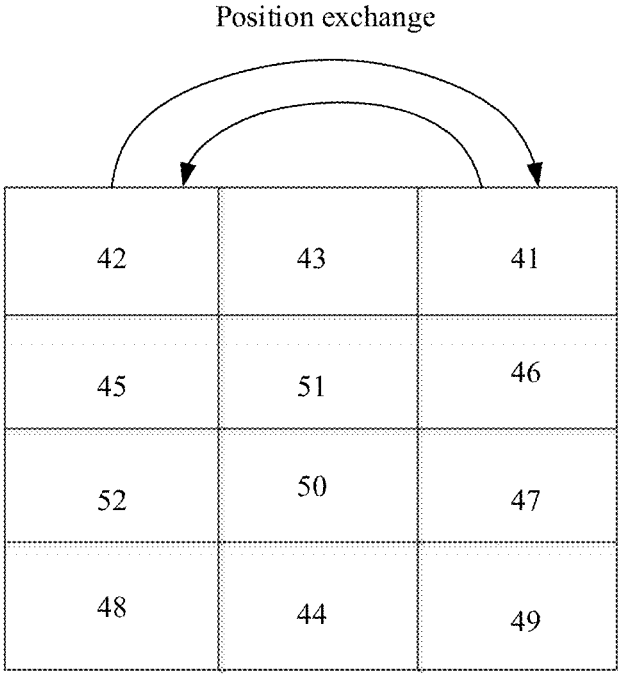
FIG. 4A is a schematic diagram of a first image according to an embodiment of the present disclosure.
Figure 4B:
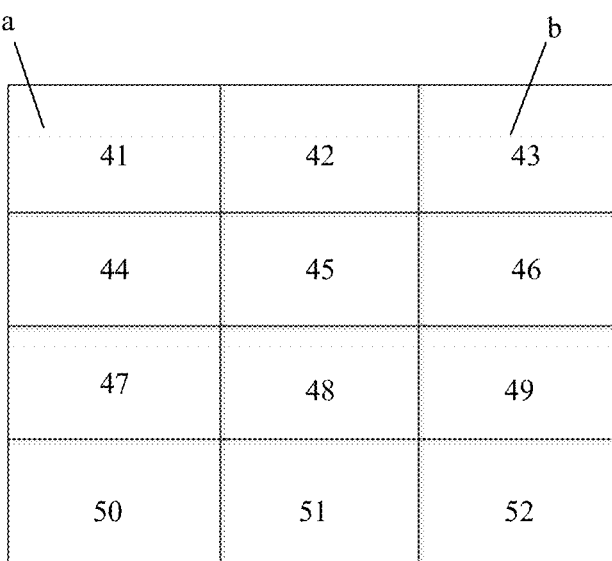
FIG. 4B is a schematic diagram showing positions before sub-images in FIG. 4A are disarranged.

For example, the image processing according to an embodiment of present disclosure may be implemented as a jigsaw-solving operation for an image in the terminal device. For the jigsaw-solving process in this embodiment, in each jigsaw-solving step, two or more randomly selected sub-images may subject to position exchange, and it is determined for each sub-image whether the exchanged position of the sub-image is correct. If the exchanged position of the sub-image is correct, the sub-image is fixed to this position and the position of the sub-image is stopped being exchanged. If the exchanged position of the sub-image is not correct, the sub-image will continue to participate in the subsequent position exchange. After all the sub-images on the first image are restored to correct positions, the jigsaw-solving ends to acquire the second image. For example, FIG. 4A is a schematic diagram of a first image according to an embodiment of the present disclosure. FIG. 4B is a schematic diagram showing positions before sub-images in FIG. 4A are disarranged. The image shown in FIG. 4B may be understood as an image obtained by performing a dividing processing on an original image, or may be understood as an image obtained by performing a dividing processing on an image of a target object extracted from the original image.

Numbers in FIG. 4A and FIG. 4B represent different sub-images. As shown in FIG. 4A, assuming sub-image 41 and sub-image 42 are two sub-images that are randomly selected, then positions of sub-image 41 and sub-image 42 will be exchanged with each other during the jigsaw-solving. The brightness and/or color at the original positions of the sub-image 41 and the sub-image 42 will be changed to a preset brightness or color (e.g., black or white) during the exchange, to achieve the flashing effect. After completing the position exchange, the color and brightness at the exchanged position of the sub-image 41 are restored to the color and brightness of the sub-image 41, and the color and brightness at the exchanged position of the sub-image 42 are restored to the color and brightness of the sub-image 42. After completing the position exchange, the sub-image 41 is compared with the image at position a in FIG. 4B, and the sub-image 42 is compared with the image at position b in FIG. 4B. If the sub-image 41 is consistent with the image at the position a, and the sub-image 42 is inconsistent with the image at position b, then the sub-image 41 will no longer participate in the position exchange, and sub-image 42 will continue to participate in the image exchange. The above process is also performed on other sub-images, until all sub-images are restored to correct positions, so as to acquire the second image. Apparently, the above is just an exemplary illustration, rather than limitation on the present disclosure. For example, in other embodiments, the method for determining whether the position of the sub-image is correct may be set as needed without being limited to the method provided by the above examples.

In Step 103, the acquired second image is displayed.

In this embodiment, a trigger instruction of a user and a first image are acquired, and then a jigsaw-solving operation is performed on the first image in response to the acquired trigger instructions. During the jigsaw-solving operation, positions of sub-images on the first image are randomly exchanged, so that all the sub-images on the first image are restored to positions before being disarranged, to acquire a second image after the jigsaw-solving operation. The process of random exchange of sub-images and the second image after the jigsaw-solving operation are displayed, and the brightness and/or color at the original position of the sub-image are changed to the preset brightness or color during the process of random exchange of sub-images to achieve the flashing effect, so that the entire process of the jigsaw-solving operation is visible to users and has a flashing effect. In the embodiment of the present disclosure, the jigsaw-solving operation is performed by randomly exchanging positions of sub-images, the jigsaw-solving process is random, and a flashing effect can be realized during the process of random exchange of sub-images, thereby providing a better visual display effect and more interests during the jigsaw-solving, and improving the user experience.

Figure 5:
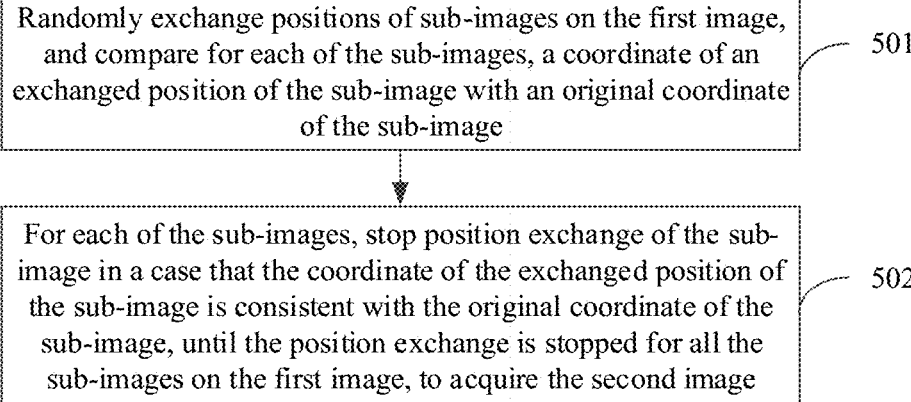
FIG. 5 is a flowchart of a method of randomly exchanging positions of sub-images according to an embodiment of the present disclosure.

FIG. 5 is a flowchart of a method of randomly exchanging positions of sub-images according to an embodiment of the present disclosure. As shown in FIG. 5, the method includes the following steps S501 and S502.

In Step 501, positions of sub-images on the first image are randomly exchanged, and for each of the sub-images, a coordinate of an exchanged position of the sub-image is compared with an original coordinate of the sub-image.

In Step 502, for each of the sub-images, the position of the sub-image is stopped being exchanged in a case that the coordinate of the exchanged position of the sub-image is consistent with the original coordinate of the sub-image, until the position exchange is stopped for all the sub-images on the first image, to acquire the second image.

As an example, in this embodiment, the method of the embodiment of FIG. 1 may be used to divide the original image to obtain a preset quantity of sub-images, or the method of the embodiment of FIG. 1 may be used to divide an image of a target object extracted from the original image to obtain the preset quantity of sub-images. Further, in this embodiment, after obtaining the preset quantity of sub-images through dividing, it is to record an original coordinate of each sub-image in the original image or in the image of the target object.

In order to improve the speed for the jigsaw-solving and prevent the sub-image from being exchanged to a wrong position after the sub-image has been restored to the correct position (that is, the position before the disarrangement), in an embodiment, after the preset quantity of sub-images are acquired by dividing the original image or the image of the target object, each sub-image may be uniquely identified according to a preset algorithm or identification method, and the unique identifier of each sub-image may be recorded in a preset list. During the jigsaw-solving, two or more identifiers are randomly selected from the preset list, and positions of sub-images corresponding to the identifiers are exchanged. If a sub-image is restored to the correct position after the position exchange, the identifier of the sub-image is removed from the preset list, so that the sub-image will no longer be exchanged positions with other sub-images. When all the identifiers are deleted from the preset list, all the sub-images are determined to be restored to their correct positions, and the jigsaw is completed. If there are some remaining identifiers in the preset list, two or more identifiers are selected from the remaining identifiers, and positions of sub-images corresponding to these identifiers are exchanged until the preset list is emptied. Apparently, the above way of recording sub-images that have not been restored to correct positions using the preset list is only an exemplary way, rather than all ways of this embodiment. In fact, any scheme ensuring that a sub-image restored to the correct position will not be exchanged the position with other sub-images may be used in this embodiment, and the disclosure is not limited to a specific scheme.

Figure 6A:
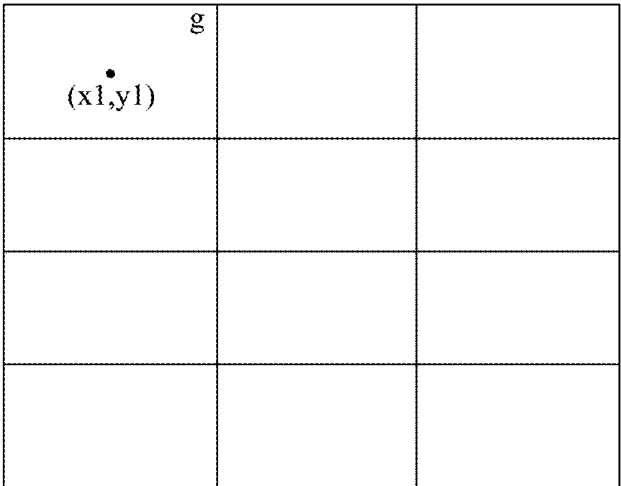
FIG. 6A is a schematic diagram showing that an original image is divided into 12 sub-images.

FIG. 6A is a schematic diagram showing that an original image is divided into 12 sub-images, and FIG. 6B is a schematic diagram showing that the sub-images in FIG. 6A are disarranged. As shown in FIG. 6A, each sub-image in FIG. 6A has a unique identifier which is recorded in the preset list. A coordinate of each sub-image in FIG. 6A in a coordinate system of the original image is an original coordinate corresponding to each sub-image. For each sub-image, the coordinate of the sub-image may be exemplarily represented by the coordinate of a center point of the sub-image. For example, in FIG. 6A, the coordinate of the center point of the first sub-image g is $(x1, y1)$, thus the original coordinate of the first sub-image g in FIG. 6A may be denoted as $(x1, y1)$. Referring to FIG. 6B, the first sub-image g in the original FIG. 6A becomes the third sub-image in FIG. 6B after sub-images in FIG. 6 are disarranged. The coordinate of the sub-image g in FIG. 6B is $(x2, y2)$. If positions of the first sub-image h and the sub-image g in FIG. 6B are exchanged, the coordinate of the sub-image g in FIG. 6B will be changed from $(x2, y2)$ to $(x1, y1)$. At this time, it is determined that the sub-image g in FIG. 6B is restored to the position before the disarrangement, that is, the correct position. The identifier of the sub-image g will be deleted from the preset list, and sub-image g will no longer participate in the position exchange. The above process is also performed on other sub-images, until the preset list is emptied. That is, all the sub-images in FIG. 6B are restored to the positions before the disarrangement, and the position exchange is stopped, and the image in FIG. 6A is obtained again. When the sub-image g exchanges the position with the sub-image h, the brightness and/or color at the original position of each of the sub-image g and the sub-image h will be changed to a preset brightness or color (e.g., black or white) to achieve a flashing effect. After the position exchange has been completed, the color and brightness at the exchanged position of the sub-image g are restored to the color and brightness of the sub-image g, and the color and brightness at the exchanged position of the sub-image h are restored to the color and brightness of the sub-image h. By virtue of the flashing effect during the process of random exchange of sub-images, the visual display effect and interest of the jigsaw can be improved, thereby improving the user experience. Apparently, the above is only an exemplary illustration rather than the limitation of the present disclosure.

In this embodiment, original coordinates of sub-images before the disarrangement are recorded, and positions of the sub-images are randomly exchanged during the jigsaw-solving process. The coordinates of the exchanged positions are compared with the original coordinates of the sub-images, which can quickly and accurately determine whether the sub-images are restored to the correct positions, thereby improving the jigsaw-solving accuracy.

FIG. 7 is a flowchart of a method of randomly exchanging positions of sub-images according to another embodiment of the present disclosure. As shown in FIG. 7, the method includes the following steps S701 and S702.

In Step 701, positions of sub-images on the first image are randomly exchanged, and for each of the sub-images, a number of an exchanged position of the sub-image is compared with a number of an original position corresponding to the sub-image.

In Step 702, for each of the sub-images, the position exchange of the sub-image is stopped if the number of the exchanged position of the sub-image is consistent with the number of the original position corresponding to the sub-image, until the position exchange is stopped for all the sub-images on the first image, to acquire the second image.

In this embodiment, after obtaining a preset quantity of sub-images by dividing the original image or the image of the target object, the original position of each sub-image on the original image or on the image of the target object is numbered, and a correspondence between each sub-image and the number of the original position is recorded. During the jigsaw-solving process, positions of the sub-images on the first image are randomly exchanged, and the numbers of the exchanged positions are compared with the numbers of the original positions corresponding to the sub-images. If consistent, for example, the number of the original position is 5, and the exchanged position is returned to the position numbered 5, then it is determined that the sub-image is restored to the position before the disarrangement, and the sub-image will not participate in the subsequent position exchange. If inconsistent, for example, the number of the original position is 5, the exchanged position is changed to the position numbered 6, then it is determined that the sub-image has not been restored to the position before the disarrangement, and the sub-image will continue to participate in the subsequent position exchange, until all the sub-images on the first image are restored to the positions before the disarrangement, and the jigsaw-solving is completed.

In order to improve the speed for the jigsaw-solving and prevent the sub-images from being exchanged to wrong positions after the sub-images have been restored to the correct positions, the method of the embodiment in FIG. 5 may also be applied to this embodiment, that is, identifiers of sub-images which have not been restored to correct positions are recorded in the preset list and sub-images whose positions are to be exchanged are selected from the preset list, whereby it is determined whether the jigsaw is completed. The above process is performed in a similar manner and has similar beneficial effects to those of the embodiment in FIG. 5, which is not repeated here.

In this embodiment, numbers of original positions of sub-images before the disarrangement are recorded, and positions of the sub-images are randomly exchanged during the jigsaw-solving process. Numbers of the exchanged positions are compared with the numbers of the original positions of the sub-images, which can quickly and accurately determine whether the sub-images are restored to the correct positions, thereby improving the jigsaw-solving accuracy.

FIG. 8 is a flowchart of an image processing method according to another embodiment of the present disclosure. As shown in FIG. 8, the method includes the following steps S1 to S13.

In S1, an original image is acquired, and a face image is extracted from the original image.

In S2, the face image is divided into a preset quantity of sub-images, each sub-image on the face image is uniquely identified, and a unique identifier of each sub-image is stored in a preset list.

In S3, it is determine whether a terminal device is in a video recording state. S4 to S 9 are performed if the terminal device is not in the video recording state; or, S10 is performed if the terminal device is in the video recording state.

In S4, positions of the sub-images on the face image are disarranged to obtain a first image, and the process of disarranging the sub-images is recorded.

In S5, a trigger instruction of a user is detected.

In S6, positions of the sub-images on the first image are randomly exchanged, and the process of the position exchange of the sub-images is recorded.

In S7, it is determined whether an exchanged position of a sub-image is correct (i.e., whether it is the position before being disarranged). S8 and S9 are performed if the exchanged position of the sub-image is correct; otherwise, jump to S6.

In S8, an identifier of the sub-image in the correct position is deleted from the preset list.

In S9, it is determined whether the preset list is empty. S13 is performed if the preset list is empty; otherwise, jump to S6.

In S10, the record of the disarrangement process and the record of the process of the position exchange of the sub-images are acquired. The record of the disarrangement process is from S4, and the record of the process of the position exchange of the sub-images is from S6.

In S11, it is determined whether there is a complete record of the disarrangement process and a complete record of the process of the position exchange of the sub-images. S12 and S13 are performed if whether there is a complete record of the disarrangement process and a complete record of the process of the position exchange of the sub-images; otherwise, jump to S4.

In S12, positions of the sub-images on the face image are disarranged according to the record of the disarrangement process, and a jigsaw-solving is performed according to the record of exchanging the positions of the sub-images.

In S13, the jigsaw-solving is completed, and a second image acquired by the jigsaw-solving is displayed.

It should be noted that although a face image is taken as an example for illustration in FIG. 8, in other embodiments, the face image in the embodiment of FIG. 8 may be replaced with other images.

In this embodiment, the image is divided into multiple sub-images, and positions of the multiple sub-images are disarranged. Then, the positions of the sub-images are randomly exchanged to perform a jigsaw-solving, and the disarrangement process and the jigsaw-solving process are recorded to generate a jigsaw-solving video, which can provide richer display effects, improve the fun of video recording, and improve user experience.

Figure 9:
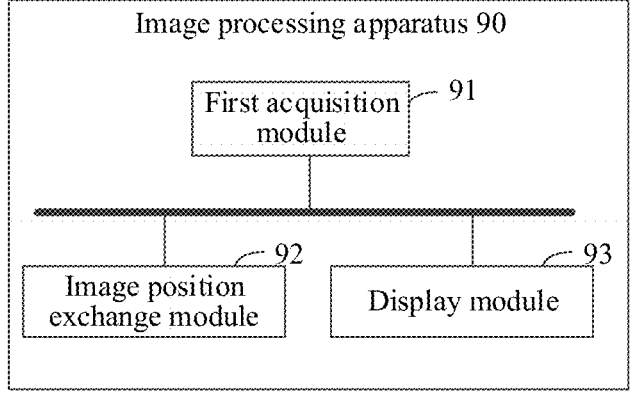
FIG. 9 is a schematic structural diagram of an image processing apparatus according to an embodiment of the present disclosure.

FIG. 9 is a structural block diagram of an image processing apparatus according to an embodiment of the present disclosure. The apparatus may be embodied as a terminal device in the foregoing embodiments, or some functional modules in the terminal device. As shown in FIG. 9, the image processing apparatus 90 includes: a first acquisition module 91, an image position exchange module 92, and a display module 93.

The first acquisition module 91 is configured to acquire a trigger instruction of a user and a first image. The first image includes two or more sub-images. Positions of the two or more sub-images on the first image are disarranged.

The image position exchange module 92 is configured to randomly exchange positions of the sub-images on the first image in response to the trigger instruction, until all the sub-images on the first image are restored to positions before being disarranged, to acquire a second image.

The display module 93 is configured to display a process of the random exchange of the sub-images, and display the acquired second image.

In an embodiment, the first acquisition module 91 includes: an acquisition unit and an image processing unit.

The acquisition unit is configured to acquire an original image and an image processing instruction of the user.

The image processing unit is configured to divide the original image according to the image processing instruction to obtain a preset quantity of sub-images, and disarrange positions of the preset quantity of sub-images to obtain the first image. The preset quantity is greater than or equal to 2.

In yet another embodiment, the image processing unit is configured to:

extract an image of a target object from the original image; and divide the image of the target object into the preset quantity of sub-images.

In yet another embodiment, the image processing apparatus 90 may further include:

a recording module, configured to record an original coordinate of each sub-image.

In yet another embodiment, the image position exchange module 92 is configured to:

randomly exchange positions of the sub-images on the first image, and for each of the sub-images, compare a coordinate of an exchanged position of the sub-image with an original coordinate of the sub-image; and for each of the sub-images, stop exchanging of the position of the sub-image in a case that the coordinate of the exchanged position of the sub-image is consistent with the original coordinate of the sub-image, until the position exchange is stopped for all the sub-images on the first image, to acquire the second image.

In yet another embodiment, the image processing apparatus 90 may further include:

a numbering module, configured to number original positions of the preset quantity of sub-images, and record the number of the original position corresponding to each sub-image.

In yet another embodiment, the image position exchange module 92 is configured to:

randomly exchange positions of the sub-images on the first image, and for each of the sub-images, compare a number of an exchanged position of the sub-image with a number of an original position corresponding to the sub-image; and for each of the sub-images, stop exchanging the position of the sub-image if the number of the exchanged position of the sub-image is consistent with the number of the original position corresponding to the sub-image, until the position exchange is stopped for all the sub-images on the first image, to acquire the second image.

In yet another embodiment, the image processing apparatus 90 may further include:

a color processing module, configured to adjust, when the position of the sub-image is randomly exchanged, a color of the position to a preset color and restore the color of the position to the color of the sub-image after the position exchange is completed.

The apparatus provided in this embodiment may execute the method in any of the foregoing embodiments in FIG. 1 to FIG. 8, and the execution manner and beneficial effects thereof are similar, and details are not described herein again.

A terminal device is further provided in an embodiment of the present disclosure. The terminal device includes a processor and a memory. The memory stores a computer program which, when being executed by the processor, causes the method in any of the foregoing embodiments FIG. 1-FIG. 8 to be implemented.

Figure 10:
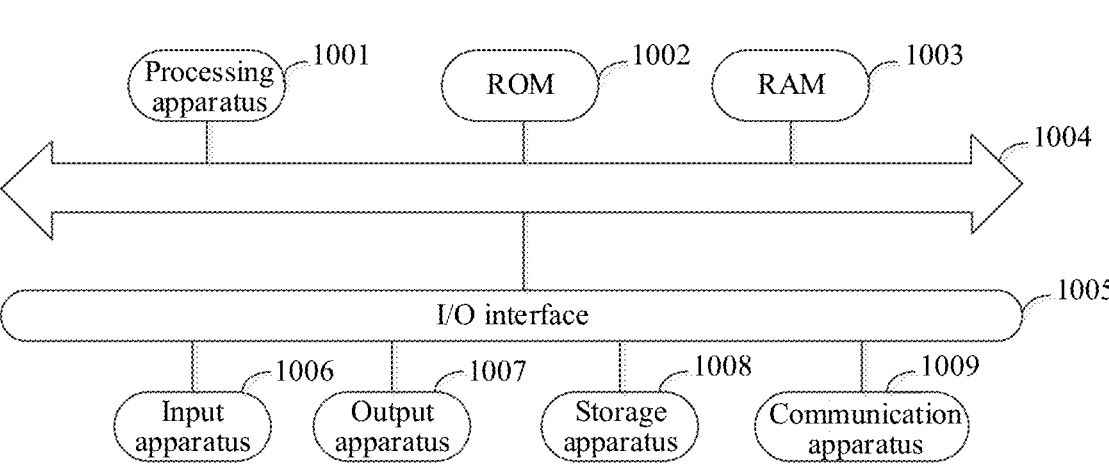
FIG. 10 is a schematic structural diagram of a terminal device according to an embodiment of the present disclosure.

FIG. 10 is a schematic structural diagram of a terminal device according to an embodiment of the present disclosure. Hereinafter reference is made to FIG. 10 which shows a schematic structural diagram of a terminal device 1000 suitable for implementing the embodiments of the present disclosure. The terminal device 1000 in the embodiments of the present disclosure may include, but not limited to, mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The terminal device shown in FIG. 10 is exemplary, and is not intended to limit the function and scope of the embodiments of the present disclosure.

As shown in FIG. 10, the terminal device 1000 may include a processing apparatus (such as a central processor and a graphic processor) 1001. The processing apparatus may perform various appropriate actions and processing by executing programs stored in a read-only memory (ROM) 1002 or programs uploaded from a storage apparatus 1008 to a random access memory (RAM) 1003. Various programs and data required for operations of the terminal device 1000 are also stored in the RAM 1003. The processing apparatus 1001, the ROM 1002 and the RAM 1003 are connected to each other through the bus 1004. An input/output (I/O) interface 1005 is also connected to the bus 1004.

Generally, the following components are connected to the I/O interface 1005: an input apparatus 1006 such as a touch screen, a touch panel, a keyboard, a mouse, a camera, a microphone, an accelerometer, and gyroscope; an output apparatus 1007 such as a liquid crystal display (LCD), a loudspeaker and a vibrator; a storage apparatus 1008 such as a magnetic tape and a hard disk; and a communication apparatus 1009. The communication apparatus 1009 may allow the terminal device 1000 to communicate with other device in a wired or wireless manner to exchange data. Although FIG. 13 shows the terminal device 1000 provided with various apparatuses, it should be understood that not all shown apparatuses are necessary. Alternatively, more or less apparatuses may be included.

According to embodiments of the present disclosure, a process described in the flowchart above may be implemented by computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through the communication apparatus 1009, installed from the storage apparatus 1008 or installed from the ROM 1002. The computer program is executed by the processing apparatus 1001 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data communication in any form or carried in any medium (for example, a communication network). The communication network includes a local area network (LAN), a wide area network (WAN), an international network (for example the Internet), a peer-to-peer network (for example ad hoc peer-to-peer network), and any known network or network to be developed.

The computer readable storage medium may be included in the terminal device, or the computer readable storage medium may stand alone from the terminal device, i.e., not being installed in the electronic device.

The computer readable medium carries one or more programs. When executing the one or more programs, the terminal device is instructed to perform the following operations: acquiring a trigger instruction of a user and a first image, where the first image includes two or more sub-images, and positions of the two or more sub-images on the first image are disarranged; randomly exchange positions of the sub-images on the first image in response to the trigger instruction, until all the sub-images on the first image are restored to positions before being disarranged, to acquire a second image; and displaying the acquired second image.

Computer program codes for performing operations of the present disclosure may be written by using one or more program design languages or any combination. The program design languages include but not limited to object oriented program design language such as Java, Smalltalk and C++, and further include conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving Internet connection by services provided by Internet network service provider).

The flowcharts and block diagrams shown in the drawings show system architectures, functions and operations which may be implemented by the system, method and computer program product according to the embodiments of the present disclosure. Each block in the flowcharts or the block diagrams may represent a part of a module, a program section or codes including executable instruction(s) for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware-based system for performing specified functions or operations, or may be implemented by a combination of dedicated hardware and computer instructions.

Units involved in the embodiments of the present disclosure may be implemented by software or hardware. Names of the units do not limit the units in a certain case.

The functions described above herein may be partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

A computer-readable storage medium is further provided in an embodiment of the present disclosure. The storage medium stores a computer program which, when being executed by a processor, causes the method in any of the foregoing embodiments in FIG. 1 to FIG. 8 to be implemented. The execution manner and beneficial effects thereof are similar, and details are not described herein again.

According to one or more embodiments of the present disclosure, [Example 1] provides an image processing method, and the method includes:

acquiring a trigger instruction of a user and a first image, where the first image includes two or more sub-images, and positions of the two or more sub-images on the first image are disarranged;

randomly exchanging positions of the sub-images on the first image in response to the trigger instruction, and displaying a process of the random exchange of the sub-images, until all the sub-images on the first image are restored to positions before being disarranged, to acquire a second image; and displaying the acquired second image.

According to one or more embodiments of the present disclosure, [Example 2] provides an image processing method. The acquiring the first image includes:

acquiring an original image and an image processing instruction of the user; and dividing the original image into a preset quantity of sub-images according to the image processing instruction, and disarranging positions of the preset quantity of sub-images to obtain the first image, where the preset quantity is greater than or equal to 2.

According to one or more embodiments of the present disclosure, [Example 3] provides an image processing method. The dividing the original image into the preset quantity of sub-images includes:

extracting an image of a target object from the original image; and dividing the image of the target object into the preset quantity of sub-images.

According to one or more embodiments of the present disclosure, [Example 4] provides an image processing method. Before disarranging positions of the preset quantity of sub-images, the method further includes:

recording an original coordinate of each sub-image.

According to one or more embodiments of the present disclosure, [Example 5] provides an image processing method. The randomly exchanging positions of the sub-images on the first image and displaying the process of the random exchange of the sub-images, until all the sub-images on the first image are restored to positions before being disarranged to acquire the second image includes:

randomly exchanging positions of the sub-images on the first image, and for each of the sub-images, comparing a coordinate of an exchanged position of the sub-image with an original coordinate of the sub-image; and for each of the sub-images, stopping exchanging of the position of the sub-image in a case that the coordinate of the exchanged position of the sub-image is consistent with the original coordinate of the sub-image, until the position exchange is stopped for all the sub-images on the first image, to acquire the second image.

According to one or more embodiments of the present disclosure, [Example 6] provides an image processing method. before disarranging positions of the preset quantity of sub-images, the method further includes:

numbering original positions of the preset quantity of sub-images, and recording the number of the original position corresponding to each sub-image.

According to one or more embodiments of the present disclosure, [Example 7] provides an image processing method. The randomly exchanging positions of the sub-images on the first image in response to the trigger instruction, and displaying the process of the random exchange of the sub-images, until all the sub-images on the first image are restored to positions before being disarranged to acquire the second image includes:

randomly exchanging positions of the sub-images on the first image, and for each of the sub-images, comparing a number of an exchanged position of the sub-image with a number of an original position corresponding to the sub-image; and for each of the sub-images, stopping exchanging the position of the sub-image if the number of the exchanged position of the sub-image is consistent with the number of the original position corresponding to the sub-image, until the position exchange is stopped for all the sub-images on the first image, to acquire the second image.

According to one or more embodiments of the present disclosure, [Example 8] provides an image processing method, and the method further includes:

adjusting, when the position of the sub-image is randomly exchanged, a color of the position to a preset color, and restoring the color of the position to the color of the sub-image after the position exchange is completed.

According to one or more embodiments of the present disclosure, [Example 9] provides an image processing apparatus, and the apparatus includes:

a first acquisition module, configured to acquire a trigger instruction of a user and a first image, wherein the first image includes two or more sub-images, and positions of the two or more sub-images on the first image are disarranged;

an image position exchange module, configured to randomly exchange positions of the sub-images on the first image in response to the trigger instruction, until all the sub-images on the first image are restored to positions before being disarranged, to acquire a second image; and a display module, configured to display a process of the random exchange of the sub-images, and display the acquired second image.

According to one or more embodiments of the present disclosure, [Example 10] provides an image processing apparatus, and the first acquisition module includes:

an acquisition unit, configured to acquire an original image and an image processing instruction of the user; and an image processing unit, configured to divide the original image according to the image processing instruction to obtain a preset quantity of sub-images, and disarrange positions of the preset quantity of sub-images to obtain the first image, where the preset quantity is greater than or equal to 2.

According to one or more embodiments of the present disclosure, [Example 11] provides an image processing apparatus, and the image processing unit is configured to:

extract an image of a target object from the original image; and divide the image of the target object into the preset quantity of sub-images.

According to one or more embodiments of the present disclosure, [Example 12] provides an image processing apparatus, and the apparatus further includes:

a recording module, configured to record an original coordinate of each sub-image.

According to one or more embodiments of the present disclosure, [Example 13] provides an image processing apparatus, and the image position exchange module is configured to:

randomly exchange positions of the sub-images on the first image, and for each of the sub-images, compare a coordinate of an exchanged position of the sub-image with an original coordinate of the sub-image; and for each of the sub-images, stop exchanging of the position of the sub-image in a case that the coordinate of the exchanged position of the sub-image is consistent with the original coordinate of the sub-image, until the position exchange is stopped for all the sub-images on the first image, to acquire the second image.

According to one or more embodiments of the present disclosure, [Example 14] provides an image processing apparatus, and the apparatus further includes:

a numbering module, configured to number original positions of the preset quantity of sub-images, and record the number of the original position corresponding to each sub-image.

According to one or more embodiments of the present disclosure, [Example 15] provides an image processing apparatus, and the image position exchange module is configured to:

randomly exchange positions of the sub-images on the first image, and for each of the sub-images, compare a number of an exchanged position of the sub-image with a number of an original position corresponding to the sub-image; and for each of the sub-images, stop exchanging the position of the sub-image if the number of the exchanged position of the sub-image is consistent with the number of the original position corresponding to the sub-image, until the position exchange is stopped for all the sub-images on the first image, to acquire the second image.

According to one or more embodiments of the present disclosure, [Example 16] provides an image processing apparatus, and the apparatus further includes:

a color processing module, configured to adjust, when the position of the sub-image is randomly exchanged, a color of the position to a preset color, and restore the color of the position to the color of the sub-image after the position exchange is completed.

According to one or more embodiments of the present disclosure, [Example 17] provides a terminal device. The terminal device includes:

a processor and a memory, where the memory stores a computer program which, when being executed by the processor, causes the above method to be implemented.

According to one or more embodiments of the present disclosure, [Example 18] provides a computer-readable storage medium. The storage medium stores a computer program which, when being executed by a processor, causes the above method to be implemented.

It should be noted that, in this document, relational terms such as "first", "second" and the like are only used to distinguish one entity or operation from another entity or operation, and do not necessarily require or imply there is such actual relationship or sequence between entities or operations. Moreover, the terms "comprising", "comprising" or any other variation thereof are intended to encompass a non-exclusive inclusion such that a process, method, article or device that includes a list of elements includes not only those elements, but also includes or other elements which are not explicitly listed, or further includes elements inherent to such a process, method, article or apparatus. Without further limitation, an element defined by the phrase "comprising a . . . " does not preclude the presence of additional identical elements in a process, method, article or apparatus that includes the element.

The above descriptions are only specific embodiments of the present disclosure, so that those skilled in the art can understand or implement the present disclosure. Various modifications to these embodiments will be readily apparent to those skilled in the art, and the generic principles defined herein may be implemented in other embodiments without departing from the spirit or scope of the present disclosure. Therefore, the present disclosure is not intended to be limited to the embodiments described herein, but is to be accorded the widest scope consistent with the principles and novel features disclosed herein.

The invention claimed is:

1. An image processing method, implemented by a terminal device, comprising:

acquiring a trigger instruction of a user and a first image, wherein the first image comprises more than two sub-images, and positions of the more than two sub-images on the first image are disarranged;

randomly exchanging positions of the sub-images on the first image in response to the trigger instruction and fixing the sub-image to the exchanged position of the sub-image if the exchanged position of the sub-image is correct, and displaying a process of the random exchange of the sub-images, until all the sub-images on the first image are restored to positions before being disarranged, to acquire a second image; and displaying the acquired second image.

2. The method according to claim 1, wherein the acquiring the first image comprises:

acquiring an original image and an image processing instruction of the user; and dividing the original image into a preset quantity of sub-images according to the image processing instruction, and disarranging positions of the preset quantity of sub-images to obtain the first image, wherein the preset quantity is greater than or equal to 2.

3. The method according to claim 2, wherein the dividing the original image into the preset quantity of sub-images comprises:

extracting an image of a target object from the original image; and dividing the image of the target object into the preset quantity of sub-images.

4. The method according to claim 2, wherein before disarranging positions of the preset quantity of sub-images, the method further comprises:

recording an original coordinate of each sub-image.

5. The method according to claim 4, wherein the randomly exchanging positions of the sub-images on the first image and fixing the sub-image to the exchanged position of the sub-image if the exchanged position of the sub-image is correct and displaying the process of the random exchange of the sub-images, until all the sub-images on the first image are restored to positions before being disarranged to acquire the second image comprises:

randomly exchanging positions of the sub-images on the first image, and for each of the sub-images, comparing a coordinate of an exchanged position of the sub-image with an original coordinate of the sub-image; and for each of the sub-images, stopping position exchange of the sub-image in a case that the coordinate of the exchanged position of the sub-image is consistent with the original coordinate of the sub-image, until the position exchange is stopped for all the sub-images on the first image, to acquire the second image.

6. The method according to claim 2, wherein before disarranging positions of the preset quantity of sub-images, the method further comprises:

numbering original positions of the preset quantity of sub-images, and recording the number of the original position corresponding to each sub-image.

7. The method according to claim 6, wherein randomly exchanging positions of the sub-images on the first image and fixing the sub-image to the exchanged position of the sub-image if the exchanged position of the sub-image is correct and displaying the process of the random exchange of the sub-images, until all the sub-images on the first image are restored to positions before being disarranged to acquire the second image comprises:

randomly exchanging positions of the sub-images on the first image, and for each of the sub-images, comparing a number of an exchanged position of the sub-image with a number of an original position corresponding to the sub-image; and for each of the sub-images, stopping exchanging the position of the sub-image if the number of the exchanged position of the sub-image is consistent with the number of the original position corresponding to the sub-image, until the position exchange is stopped for all the sub-images on the first image, to acquire the second image.

8. The method according to claim 1, wherein the method further comprises:

adjusting, when the position of the sub-image is randomly exchanged, a color of the position to a preset color, and restoring the color of the position to the color of the sub-image after the position exchange is completed.

9. An image processing device, comprising:

a processor and a memory, wherein the memory stores a computer program which, when being executed by the processor, causes the processor to:

acquire a trigger instruction of a user and a first image, wherein the first image comprises more than two sub-images, and positions of the more than two sub-images on the first image are disarranged;

randomly exchange positions of the sub-images on the first image in response to the trigger instruction and fix the sub-image to the exchanged position of the sub-image if the exchanged position of the sub-image is correct, until all the sub-images on the first image are restored to positions before being disarranged, to acquire a second image; and display a process of the random exchange of the sub-images, and display the acquired second image.

10. The device according to claim 9, wherein the processor is further caused to:

acquire an original image and an image processing instruction of the user; and divide the original image according to the image processing instruction to obtain a preset quantity of sub-images, and disarrange positions of the preset quantity of sub-images to obtain the first image, wherein the preset quantity is greater than or equal to 2.

11. The device according to claim 10, wherein the processor is further caused to:

extract an image of a target object from the original image; and divide the image of the target object into the preset quantity of sub-images.

12. The device according to claim 10, wherein the processor is further caused to:

record an original coordinate of each sub-image.

13. The device according to claim 12, wherein the processor is further caused to:

randomly exchange positions of the sub-images on the first image, and for each of the sub-images, compare a coordinate of an exchanged position of the sub-image with an original coordinate of the sub-image; and for each of the sub-images, stop exchanging of the position of the sub-image in a case that the coordinate of the exchanged position of the sub-image is consistent with the original coordinate of the sub-image, until the position exchange is stopped for all the sub-images on the first image, acquire the second image.

14. The device according to claim 10, wherein the processor is further caused to:

number original positions of the preset quantity of sub-images, and record the number of the original position corresponding to each sub-image.

15. The device according to claim 14, wherein the processor is further caused to:

randomly exchange positions of the sub-images on the first image, and for each of the sub-images, compare a number of an exchanged position of the sub-image with a number of an original position corresponding to the sub-image; and for each of the sub-images, stop exchanging the position of the sub-image if the number of the exchanged position of the sub-image is consistent with the number of the original position corresponding to the sub-image, until the position exchange is stopped for all the sub-images on the first image, to acquire the second image.

16. The device according to claim 9, wherein the processor is further caused to:

adjust, when the position of the sub-image is randomly exchanged, a color of the position to a preset color, and restore the color of the position to the color of the sub-image after the position exchange is completed.

17. A non-transitory computer-readable storage medium, wherein the storage medium stores a computer program which, when being executed by a processor, causes the processor to implement:

acquiring a trigger instruction of a user and a first image, wherein the first image comprises more than two sub-images, and positions of the more than two sub-images on the first image are disarranged;

randomly exchanging positions of the sub-images on the first image in response to the trigger instruction and fixing the sub-image to the exchanged position of the sub-image if the exchanged position of the sub-image is correct, and displaying a process of the random exchange of the sub-images, until all the sub-images on the first image are restored to positions before being disarranged, to acquire a second image; and displaying the acquired second image.

\* \* \* \* \*